(12) United States Patent
Haartsen

(10) Patent No.: US 6,393,007 B1
(45) Date of Patent: May 21, 2002

(54) METHOD OF AND A SYSTEM FOR VOICE AND DATA RADIO COMMUNICATION PROVIDING IMPROVED INTERFERENCE DIVERSITY

(75) Inventor: Jacobus C. Haartsen, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/172,857

(22) Filed: Oct. 15, 1998

Related U.S. Application Data

(60) Provisional application No. 60/062,228, filed on Oct. 16, 1997.

(51) Int. Cl.[7] .................................................. H04J 3/16
(52) U.S. Cl. ........................................ 370/337; 370/342
(58) Field of Search ................................. 370/280, 321, 370/329, 337, 347, 442, 458, 436, 437, 493, 468; 375/132, 138

(56) References Cited

U.S. PATENT DOCUMENTS

| | | | |
|---|---|---|---|
| 5,020,056 A | | 5/1991 | Chennakeshu ............. 370/95.3 |
| 5,291,475 A | * | 3/1994 | Bruckert |
| 5,430,775 A | | 7/1995 | Fulghum et al. ............ 375/202 |
| 5,521,925 A | * | 5/1996 | Merakos et al. |
| 5,528,622 A | * | 6/1996 | Cadd et al. ................. 375/202 |
| 5,586,120 A | * | 12/1996 | Cadd .......................... 370/468 |
| 5,726,983 A | * | 3/1998 | Bakke et al. ............... 370/337 |

FOREIGN PATENT DOCUMENTS

| | | |
|---|---|---|
| EP | 399612 | 11/1990 |
| WO | WO93/17507 | 9/1993 |
| WO | WO93/22850 | 11/1993 |

OTHER PUBLICATIONS

European Search Report re EP 97 20 3219 Date of mailing of search: Apr. 14, 1998.

* cited by examiner

Primary Examiner—Douglas Olms
Assistant Examiner—Ken Vanderpuye
(74) Attorney, Agent, or Firm—Burns, Doane, Swecker & Mathis, L.L.P.

(57) ABSTRACT

A method of and a system for radio communication in a Time Division Multiple Access (TDMA) radio communication system, wherein a communication channel includes at least one time slot of a plurality of sequential time slots forming a TDMA frame, and wherein a time slot of a frame hops in position between sequential frames. The hopping of a time slot depends on the type of information transmitted in the time slot.

21 Claims, 4 Drawing Sheets

METHOD OF AND A SYSTEM FOR VOICE AND DATA RADIO COMMUNICATION PROVIDING IMPROVED INTERFERENCE DIVERSITY

This application claims priority under 35 U.S.C. §§119 and/or 365 to U.S. Provisional Application No. 60/062,228 filed in U.S. on Oct. 16, 1997; the entire content of which is hereby incorporated by reference.

FIELD OF THE INVENTION

The present invention relates generally to telecommunication systems and, more specifically to radio communication systems for both voice and data transmission between two or more telecommunication units, at least one of which can be mobile.

BACKGROUND OF THE INVENTION

In the past decade, various techniques and concepts of radio communication systems for mobile telephony and data transmission have been developed. In general, two types of mobile communication systems can be distinguished, One is cellular communication, providing service to mobile subscribers which may move relatively fast through relatively wide areas, called cells. Analog cellular systems, such as designated AMPS, ETACS, NMT-450 and NMT-900 have been deployed throughout the world. Digital cellular systems are designated IS-54B, D AMPS in the Unites States, PDC in Japan and the pan-European GSM system.

Cordless radio communication is the other system, ranging from simple residential cordless telephones to business cordless systems capable of serving hundreds or even thousands of cordless communications units across (large) offices or production halls, etc. and local public communication. Analog cordless systems are designated CT0, CT1 en CT1+. Digital cordless systems are designated CT2, CT2-CAI, CT3, PHS and DECT.

GSM, D-AMPS, PDC and CT3, PHS and DECT use a digital access technique known as TDMA (Time Division Multiple Access), wherein transmissions take place in time slots and a plurality of time slots are gathered in a frame. Some emerging digital communication systems use CDMA (Code Division Multiple Access) as their access technique for establishing radio communication between communication units of a system. In general, these mobile or cordless communication systems are arranged for providing service at Multiple Carriers (MC) in a radio transmission band. That is, transmission at a particular carrier is provided using either TDMA or CDMA.

In cellular systems, like GSM, one or a plurality of carriers are individual to a cell. Cells that are spaced sufficiently apart can re-use the same carriers, without distorting effect. This so-called frequency re-use scheme allows an operator to serve a wide coverage area with many users and only a limited spectrum.

Cordless systems such as DECT and PHS are not based on frequency re-use. Instead, all the carriers are available for each cell. The system determines which carrier and communication channel of such carrier can be used for communication purposes, with the least amount of interference. Carriers and communication channels are dynamically allocated before and/or during transmission, which is called DCA (Dynamic Channel Allocation). Accordingly, no frequency planning or the involvement of an operator which controls the frequency spectrum are required.

For application in the home, like a wireless extension of the PSTN (Public Switched Telephone Network), or for wireless extensions of a LAN (Local Area Network), so-called unlicensed radio transmission bands are used. That is, subscribers do not require a license for operating radio equipment in such a radio transmission band. However, rules imposed on unlicensed bands by regulatory bodies like ETSI in Europe and the FCC in the U.S. prevent a single user of claiming the entire transmission band. Such rules usually involve collision avoidance schemes or spreading. In the case of spreading, the transmission of a subscriber is spreaded over the entire transmission band. Since different transmissions are uncoordinated, a radio air interface has to be applied which is robust against interference.

A global unlicensed transmission band has been defined at 2.4 GHz. Radio communication systems that are deployed in this unlicensed band have to adhere to strict rules defined by ETSI and the FCC. In the 2.4 GHz ISM (Industrial Scientific Medical) transmission band, spreading is mandatory. This means that a DCA schema used for DECT is not permitted. Instead FH (Frequency Hop) spreading or DS (Direct Sequence) spreading has to be applied, for example.

International Patent Application WO 93/17507 of applicant, which is herein included by reference, discloses several FH schemes for a TDMA radio communication system, wherein radio communication units transmit at radio channels in accordance with pseudo-random channel hopping schemes.

International Patent Application WO 93/22850 discloses a method of increasing interference diversity in a TDMA radio communication system, wherein frequency hopping is used and interference diversity is further increased in that communication channels also hop in a time slot raster. That is, instead of a fixed time slot allocation, time slots hop in position between sequential frames, i.e. TH (time slot hopping).

The ISM band is open to all equipment that fulfills the FCC and ETSI rules. Coordination between systems, to reduce interference, is not allowed, This means that the air interface of a communication system has to cope with unknown interference and jammers.

By applying any or both FH and TH schemes, the transmission of information in both frequency and time is randomised. That is, during a session, a communication channel occupies different frequency and time positions, such that the interference encountered at a communication channel is an average of all the channels at the transmission band. This is of particular advantage for voice transmission.

In practice, cellular and cordless radio communication systems both support voice and data transmission. In the context of the present description, the term voice communication is used for real time transmission of speech, whereas the term data communication is used for the transmission of other information, inclusive non-real time speech.

To enable error free delivery of data, data transmission typically uses a retransmission scheme to retransmit data packets that have been received in error. In an ARQ (Automatic Retransmission Query) scheme, the sender of the data is notified by the recipient about the performance of the previous transmission. If the sender has been informed that the reception was in error, the erroneous data is automatically retransmitted. In TDMA system like DECT, asymmetric data links can be established in which most of the time slots of a TDMA frame are allocated for simplex data transfer, i.e. in one direction only. However, at least one return communication channel has to remain in force to provide the ARQ information. To minimize delay and, accordingly, maximize throughput, the return channel directly follows the data channels. As a consequence, the recipient can acknowledge all data immediately preceding the return channel.

However, using a time slot hopping scheme, due to the random character of the hopping scheme, the return channel in a particular frame may end up in front of the data packets. Accordingly, immediate acknowledgment of received data packets in the same frame is not possible, simply because the return channel is not available after receipt of the data packets. Absence of the ARQ information results in an automatic retransmission of the previously transmitted data by the sender. This, despite the fact that the data might have arrived correctly. Those skilled in the art will appreciate that the throughput of the system is considerably reduced, and on average only 50% of the maximum throughput capacity is achieved.

SUMMARY OF THE INVENTION

It is an object of the present invention to provide a method of and equipment for radio communication, applying time hopping of time slots of a TDMA frame, suitable for coexistence of various types of communication in the same frame.

It is in particular an object of the present invention to provide an optimized allocation of time slots of a TDMA frame to support voice transmission in error prone radio communication systems, such as the unlicensed ISM band.

These and other objects, advantages and features of the present invention are provided by a method of radio communication in a TDMA radio communication system, wherein a communication channel comprises at least one time slot of a plurality of sequential time slots forming a TDMA frame and wherein a time slot of a frame hops in position between sequential frames. According to the present invention, the hopping of a time slot depends on the type of communication channel to which the time slot is allocated.

Following the method according to the invention, the hopping of time slots in a TDMA frame is communication channel dependent. That is, instead of pseudo-randomly hopping the position of the time slots in a frame, i.e. the communication channels to which the time slots are allocated, in the method according to the invention, the hopping of time slots is controlled by the type of communication channel, such as a voice communication channel or a data communication channel. In a preferred embodiment of the method according to the invention, hopping of time slots between sequential frames is restricted to time slots allocated to voice communication channels, whereas time slots allocated to data communication channels occupy fixed positions in a frame.

This embodiment of the method according to the invention provides optimum interference diversity for voice communication, whereas data transmission can be accomplished following an ARQ scheme. This, because the sequence of data communication channels is not affected by the method according to the invention, such that the return channel is always available after the data have been transferred.

It is noted that with this transmission scheme, the data communication channels are more vulnerable for interference than the voice communication channels. This, due to the absence of interference diversity for the time slots allocated to data communication channels. However, using an ARQ scheme, distorted data packets can be easily replaced by applying retransmissions.

In a further embodiment of the method according to the invention, in order to improve interference diversity for both voice and data communication channels, the radio communication system is arranged for radio communication in a predetermined radio frequency transmission band comprising a plurality of radio frequency transmission channels, and each such radio frequency transmission channel comprises a plurality of communication channels in a TDMA frame. Interference diversity is increased by having each TDMA frame hopping in position over the frequency transmission channels.

That is, by applying a frequency hopping scheme to the TDMA frames, for example such that each subsequent frame is transmitted in a subsequent radio frequency transmission channel, interference of data time slots is averaged over the radio frequency transmission band of the system.

In order to maintain time slots integrity, in a further embodiment of the invention, the hop positions of time slots allocated to voice communication channels are limited to time slots of a frame not allocated to data transmission channels.

In a preferred embodiment of the method according to the invention, a clear separation between time slots allocated to voice communication channels and time slots allocated to data communication channels is provided, in that time slots for data communication are allocated from one end of a frame and time slots for voice communication are allocated from another end of the same frame. Preferably, voice communication is assigned to the leading time slots of a frame or frame half and data communication is assigned to trailing time slots of a frame or frame half. That is to say, in a TDMA/TDD (Time Division Duplex) communication system data is received and transmitted in separate halves of a frame.

Clustering of time slots in consecutive trains, i.e. voice time slot clustering and data time slot clustering is advantagous with respect to interference, since it reduces the number of collisions due to partial overlap. In addition, a maximum space for the hopping of voice time slots is provided.

In accordance with a yet further embodiment of the invention, time slot hopping is achieved in that for each consecutive frame a different time offset is determined which is added to the time slots of the frame allocated to a voice communication channel, or in general the slots which may hop. The time offset comprises a multiple of a slot time.

The number of time slots positions available for hopping changes dynamically when time slots allocated for data communication are added or released in a frame. If a TDMA frame comprises N time slots, the time hop space M of a frame is provided by: $M=N-N_d-1$, wherein $N_d$ represents the number of time slots of a TDMA frame assigned to data communication. In the case of a TDMA/TDD frame the time offset M is: $M=N/2-N'_d-1$ wherein $N'_d$ represents the largest number of time slots in a frame half of TDMA/TDD frame occupied by data communication channels. Note that due to asymmetric data communication channels, the number of time slots allocated to data communication may differ from one frame half to the another of a TDMA/TDD frame.

In a preferred embodiment of the method according to the invention, the hopping time slots wrap around time slot $M-1$ counted from the end of a frame or frame half of which the hopping time slots are assigned. Channels that are shifted outside the time hop space rotate back to this end of the frame. For TDMA/TDD the wrapping around procedure may be performed separately for each frame half.

For synchronisation purposes, the time offset of a frame is transferred to each communication unit of the radio communication system operative on a communication channel suitable for time slot hopping, such as a voice communication channel. In a radio communication system arranged for radio communication between a radio access unit or radio base station and a plurality of remote radio communication units, such as portable telephones and computer equipment, for example, the time offset is transferred from the radio access units to the remote radio communication units.

In the embodiments of the invention in which TDMA frames hop in position between radio frequency transmission channels of a radio frequency transmission band, fast synchronisation between radio communication units is achieved, in a still further embodiment of the invention, by having one unit continuously transmitting, such as the radio access unit, whereas the other unit scans a particular radio frequency transmission channel for the receipt of a transmission, and locks to the hopping of the frames at receipt of a transmission. If no communication channel is active, one or more so-called dummy bearers are transmitted, which are also time and frequency hopped.

Time hop synchronisation is accomplished by scanning all the time slots of a frame or frame half, until a message has arrived comprising information as to the time hop sequence and time offset.

For scanning purposes, in a yet further embodiment of the method according to the invention, the radio communication unit performing the scanning sweeps through the entire radio frequency transmission band, wherein a particular radio frequency transmission channel is scanned for a number of frames at least equal to the number of radio frequency transmission channels of the radio communication systems.

The invention further relates to a radio communication system comprising a plurality of radio access units and a plurality of remote radio communication units, each access unit providing radio communication service in a limited geographical area or cell. The radio access units and the remote radio telecommunication units are arranged for providing radio communication in accordance with the method disclosed above.

In a preferred embodiment of the radio communication system according to the invention, the radio access units transmit at a common radio frequency transmission band, and the radio access units each have an individual radio frequency transmission channel hopping sequence.

In a preferred embodiment of the invention, a radio communication system for providing radio communication in the Industrial Scientific and Medical (ISM) frequency band ranging from 2400 to 2483.5 MHz is provided, comprising 79 radio frequency transmission channels, each channel having a transmission bandwidth of 1 MHz, and wherein each TDMA frame has a length of 10 ms with a hopping rate of 100 hops/s over the radio frequency transmission channels, and wherein a TDMA/TDD transmission scheme is implemented in which each frame half comprises 12 consecutive time slots.

The invention further relates to a radio access unit and a radio communication unit of a radio communication system for cordless telecommunication, comprising transceiver means and control means for performing radio communication in accordance with the method disclosed above.

The above-mentioned and other features and advantages of the invention are illustrated in the following description with reference to the enclosed drawings.

DETAILED DESCRIPTION OF THE EMBODIMENT

The invention will now be described and illustrated with reference to preferred exemplary embodiments to which the invention is, however, not limited.

Figure 1:
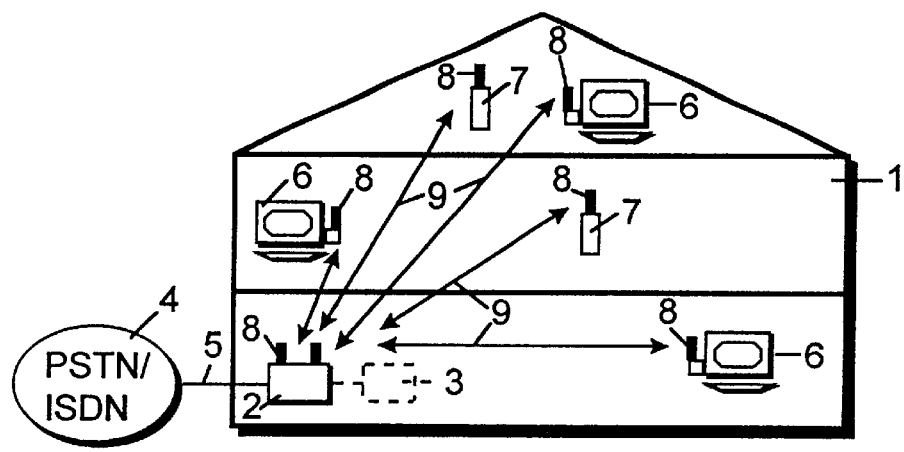
FIG. 1 shows, in a schematic and illustrative manner, a typical wireless home multimedia application, to which the present invention can be particularly applied.

FIG. 1 shows an example of a typical home multimedia application of a wireless radio communication system providing service to both voice and data.

In the home 1, a radio access unit 2, also called radio base station or RFP (Radio Fixed Part) connects by a transmission link 5 to the PSTN/ISDN (Public Switched Telephone Network/Integrated Service Digital Network). Additionally, control means 3 may connect to the radio access unit 2. Further, data processing equipment in the form of a personal computer 6, for example, and portable cordless or mobile radio telephones 7 are operative in the home 1, also designated PP (Portable Part). Each remote radio communication unit 6, 7 and the radio access unit 2 comprises transceiver and antenna means 8. The radio communication units 6, 7 and the radio access unit 2 connect by wireless links 9 which support both voice and data and cover the entire premises. Several links 9 may operate simultaneously. In the application shown, external communication of the radio communication unit 6, 7 is provided via de wireless links 9, the intermediate radio access unit 2 and the link 5 to the PSTN/ISDN. Internal connections between radio communication unit 6, 7 are provided by the radio links 9 and the radio access unit 2.

An example of a radio telecommunication system both for indoor and outdoor use is disclosed, for example, in European Patent Application 0,716,514.

Although not shown, those skilled in the art will appreciate that several radio access units 2 may operate at the premises 1, having overlapping service areas, and in that radio access units 2 of adjacent premises may have overlapping service or coverage areas. In the case of radio access units 2 operating in according with the existing low power cordless TDMA (Time Division Multiple Access)

technologies, such as designated CT3, PHS and DECT, each of the radio access units 2 and the radio communication units have a limited coverage area, having the size of a pico-, nano- or microcell, the radius of which ranges from a few meters, up to 10 m and 400 m.

Following the known DECT (Digital Enhanced Cordless Telecommunications) technology, the information over an air link 9 is transmitted in accordance with a TDMA/TDD (Time Division Duplex) protocol, wherein the first half of a frame is used for transmission and the other half of the frame is used for reception purposes, or vice versa. A DECT/ TDMA frame comprises twenty-four time slots and a frame repetition time T. During the first half of the frame, i.e. the first twelve time slots designated T0, T1, . . . T11, data is transmitted from a radio access unit to a remote radio communication unit, whereas in the second half of each frame. i.e. the second twelve time slots designated R12, R13, . . . R23, the remote communication units transmit information to the radio access units. A typical duplex radio communication link between a radio access unit and a remote radio communication unit is assigned a slot in the first half of a frame and a correspondingly located slot in the second half of the frame. Each time slot typically contains control data, system data and information or user data.

In DECT, ten carriers are available for the transmission of information, such that a maximum of 120 duplex radio communication channels is available. The frame cycle time T is 10 ms. The total number of bits per time slot amounts 480. Accordingly the system bit rate amounts 1152 kb/s. In Europe, the DECT radio frequency transmission band ranges from 1880 to 1900 MHz.

In DECT, radio communication channels or bearers are defined. The carrier frequency and slots used for a communication channel are allocated at set up. Until a switch to another frequency is required, for example to handover the radio link to a different radio access unit while the remote radio communication unit is moving (intercell handover) or if a particular carrier frequency and time slot communication becomes distorted (intracell handover). Carrier frequency and time slot combinations are continuously adaptively selected during a transmission, which is known as CDCA (Continuous Dynamic Channel Access).

In systems which do not support dynamic channel allocation or radio communication systems in which spreading of radio communication channels is mandatory, such as the requirements set by the FCC and ETSI for the 2.4 GHz ISM (Industrial Scientific and Medical) radio frequency transmission band, time hopping of time slots can be applied, in other to reduce distortion caused by pulsed jammers, for example.

Figure 3:
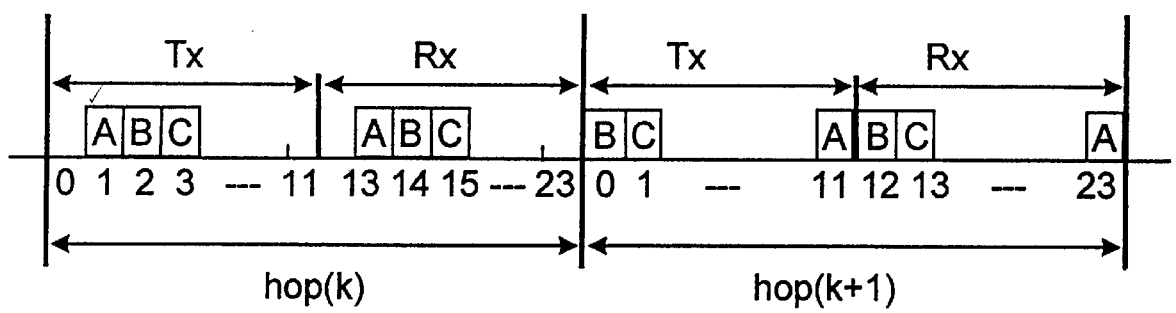
FIG. 3 shows, in a schematic and illustrative manner, a prior art hopping of time slots applied in the TDMA/TDD transmission scheme of FIG. 2.
Figure 2:
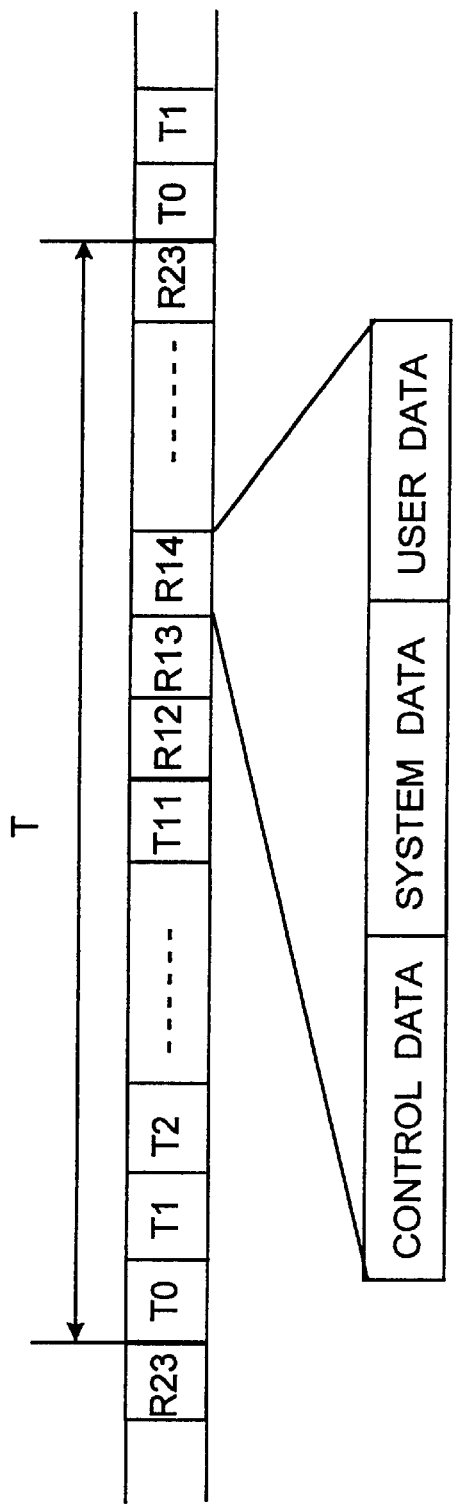
FIG. 2 shows, in a schematic and illustrative manner, a prior art digital TDMA/TDD transmission scheme.

FIG. 3 shows the effect of time hopping applied to a TDMA/TDD transmission scheme, such as shown in FIG. 2, in accordance with the cited prior art.

FIG. 3 shows two subsequent TDMA/TDD frames, indicated hop (k) and hop (k+1), respectively. The first half of each frame is the transmission half, designated Tx, whereas in the second half of each reception Rx takes place. Further, it is assumed that duplex radio communication channels A, B and C are established.

Assuming that the time slot allocated to a particular communication channels hops over 10 slot positions between subsequent frames, communication channel A, which is at time slot position 1 during hop (k) will be at time slot position 11 at the next hop (k+1) etc. Likewise, transmission channel B will be shifted from time slot 2 to time slot 0 and communication channel C shifts to time slot 1, with respect to the Tx frame half. For the Rx frame half, in this example, the same hopping scheme is applied, i.e. hopping over ten slot positions, such to maintain a slot separation of twelve slots for a duplex channel in a frame.

Although this hopping works very well for voice communication, for example, the hopping scheme is not suitable for data transmissions operating under a so-called ARQ (Automatic Retransmission Query) scheme. In such scheme, if the reception is in error, a retransmission request is send from the receiver to the transmitter, immediately after receipt of the erroneous data and in the same frame.

Assume in FIG. 3 that communication channels A and B are carrying data, wherein channel B is assigned for transmitting an ARQ request. During hop (k) data is transmitted in time slot 1, which data has to be acknowledged in time slot 14. That is, during receipt of the data and the acknowledgement thereof a time period equal to twelve time slots is available. With a frame time of 10 ms, 5 ms are available for evaluation of the received data.

However now assuming that time hopping is applied as explained above. As can be seen from FIG. 3, during hop (k+1) data channel A is moved to time slot 11, whereas the acknowledgement channel B is available during time slot 12. That is, immediately after the data becomes available. In practice, acknowledgment problems can occur if the processing circuitry is not fast enough to evaluate the received data for errors. The majority of the radio communication equipment presently available is not able to support retransmission within the slot immediately trailing received data. In general, at least one slot time difference has to be available.

In radio communication systems wherein time slots can be adaptively selected for transmission or reception, for example, when a large amount of data has to be transmitted from a radio access unit to a remote communication unit in the form of a personal computer, asymmetric data links are established. Such links occupy a plurality of time slots in a frame in the direction to the remote communication unit (downlink) and, for example, a single time slot in the direction to the radio access unit (uplink). By applying time hopping, there is a severe risk that the return channel becomes available before all the data in a frame have been transferred, such that acknowledgement within the same frame is not possible. The absence of an acknowledgment will automatically lead to a retransmission of the data, also if no errors occurred, which will reduce the data throughput of the system considerably, and on average only 50% of the maximum throughput capacity is achieved.

Figure 4:
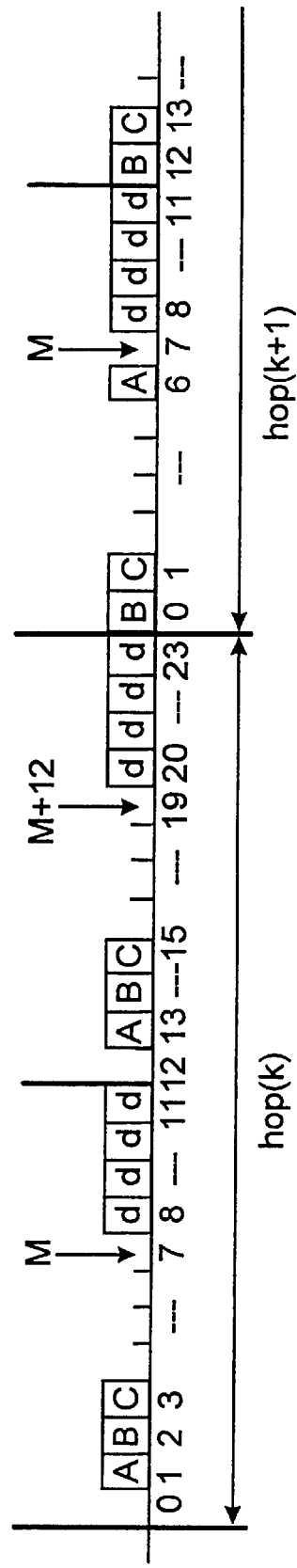
FIG. 4 shows, in a schematic and illustrative manner, a preferred embodiment of the method according to the invention.

FIG. 4 shows improved time slot hopping in accordance with the present invention. For the purpose of explaining the invention, a TDMA/TDD communication scheme is assumed in accordance with FIG. 3.

Following the method of the invention, hopping of a time slot between sequential frames is made dependent on the type of communication channel to which the time slot is allocated.

In FIG. 4, time slots A, B and C are assigned to voice communication channels, whereas the time slots d provide data communication, i.e. no real time voice information, for example using an ARQ protocol.

Following the method according to the invention, the time slots d allocated to data communication channels occupy a fixed position in the frame, whereas the time slots A, B and C allocated to voice communication hop in position between subsequent frames. As shown in FIG. 4, voice communication channel A hops from time slot 1 in hop (k) to time slot 6 in hop (k+1), with respect to the first frame half, i.e. a hop length of 5 time shot positions.

In this example, voice time slots may not hop over data time slots, in order to maintain slot integrity and to prevent slot overlap. In the present example, the voice time slots wrap around time slot 6, such that with a time slot hopping length of 5 slot positions, voice communication channel B will hop from time slot 2 in hop (k) to time slot 0 in hop (k+1), whereas voice communication channel C hops from time slot 3 in hop (k) to time slot 1 in hop (k+1). The same hopping scheme is applied to the voice communication time slots in the second half of each frame.

As can be seen from FIG. 4, the time slots d allocated to data communication are not affected by time hopping, such that a return channel will always stay behind the data channels in which the data is send, such that a propper acknowledgement within the same frame is guaranteed.

Since voice communication channel or voice bearers and data communication channels or data bearers shall not collide, a clear separation between voice and data bearers is established. Data bearers are established from one end of the TDMA frame, i.e. a frame half in the case of TDMA/TDD communication, whereas voice bearers are established from the other end of the TDMA frame or frame half. Voice communication channels are allowed to hop over the slots not used by data communication channels. The time slot allocation shown in FIG. 4 complies to this preferred embodiment.

For the allocation of data communication channels, during data transmission, first a special duplex communication is established which, amongst others is used for additional exchange of set up information. Thereafter, several duplex data communication channels can be added having a slot in both frame halfs. If the required number of slots is odd, a simplex communication channel or bearer (involving only a single slot) can be established. The data communication channels are preferably placed in consecutive time slots, with slot numbers as high as possible within the frame or frame half. Clustering of slots in consecutive trains is advantagous with respect to interference, since it reduces the number of collisions due to partial overlap. In addition, as much as possible, space is left for time hopping of voice bearers.

If the data communication channels have been allocated to time slots as disclosed above, the remaining space in a frame or frame half can be used for duplex voice communication channels. Again, in order to minimize collisions, voice communication channels too shall be clustered, that is they shall always be allocated a reference time slot with the lowest number possible. If a voice communication channel with a low reference number is released, the voice communication channel with the largest reference number shall be handed over to the just released time slot.

Those skilled in the art will appreciate that the hop space, i.e. the number of hop positions available for time slot hopping may change dynamically if bearers are added or released.

For a system with N slot positions in a frame, the time hop space M in a frame can be defined as:

$$M = Nd - 1,$$

wherein Nd is the total number of time slots of TDMA frame occupied by data communication channels.

In TDMA/TDD radio communication systems, the time hop space M is defined by:

$$M = N/2 - Nd' - 1$$

wherein Nd' is the largest number of time slots in a frame half of a TDMA/TDD frame occupied by data communication channels. This, in order to account for duplex and simplex data communication channels in a frame. With this definition of M, in all cases, one slot pair (M, M+N/2) remains empty and can be used for bearer request from other units.

Applying the above to the example shown in FIG. 4, with N=24 and Nd=N'd=4, it follows that M=7. Accordingly, the time slots allocated for voice communication wrap around time slots M−1 counted from the end of the TDMA frame, i.e. the frame half in the case of TDMA/TDD communication system from which the voice communication channels are allocated. That is, in the example shown, the lower numbered slot positions.

Time hopping is achieved by adding a time offset to the voice communication channels or voice bearers, preferably identical in the first and second half frame of TDMA/TDD scheme, and applying equally to all the voice channels. This time offset, in terms of slot times, can be chosen randomly however less than the available time hop space M. The time offset wraps around the border of the time hop space and channels that are shifted outside the time hop space rotate back to the start of the frame, as disclosed above. With this scheme, the duplex properties of a TDMA/TDD scheme remain intact, that is the uplink and downlink slots are in different frame halfs.

Those skilled in the art will appreciate that different time offsets can be applied in different radio communication systems, in order to even increase interference diversity in a radio communication system comprising several radio access units with overlapping coverage or service areas.

In the method of the invention as disclosed above the data communication channels are not spreaded in time, such that they are suitable for distortion by pulsed jammers.

Although the detrimental effect of such distortions can be relieved by using an ARQ transmission protocol, in order to increase the immunity against interferences, the method according to the invention can also be applied in connection with a FH (Frequency Hopping) scheme. By dividing the available radio frequency transmission band in a plurality of frequency transmission channels and by causing subsequent frames to be transmitted in subsequent transmission channels, the effect of a jamming source at one or a few of the frequency transmission channels is averaged over the total of frequency transmission channels available.

This type of frequency hopping, in addition to Time slot Hopping (TH) provides a very suitable radio communication system for use in the 2.4 MHz ISM band, in which serious interferers are microwave ovens for the preparation of food in homes. These microwave ovens operate right in the middle of the 2.4 GHz band and disturb a number of frequency transmission channels.

In a preferred embodiment according to the invention, in particular for use at the ISM radio frequency transmission band, 79 radio frequency transmission channels having a bandwidth of 1 MHz are defined, such that the FH sequence length is 79. The frequency hopping applied is cyclic, in that after 79 hop frequencies the same frequency is visited again. Adhering to a TDMA frame having a length of 10 ms, a hopping rate of 100 hops/s over the radio frequency transmission channels is established.

An important issue of concern in hopping systems is synchronisation: a communication can only be used when both the transmitter and the receiver hop synchronously. The synchronisation or acquisition procedure has to be optimized to minimize acquisition delay and power consumption in a standby mode.

Figure 5:
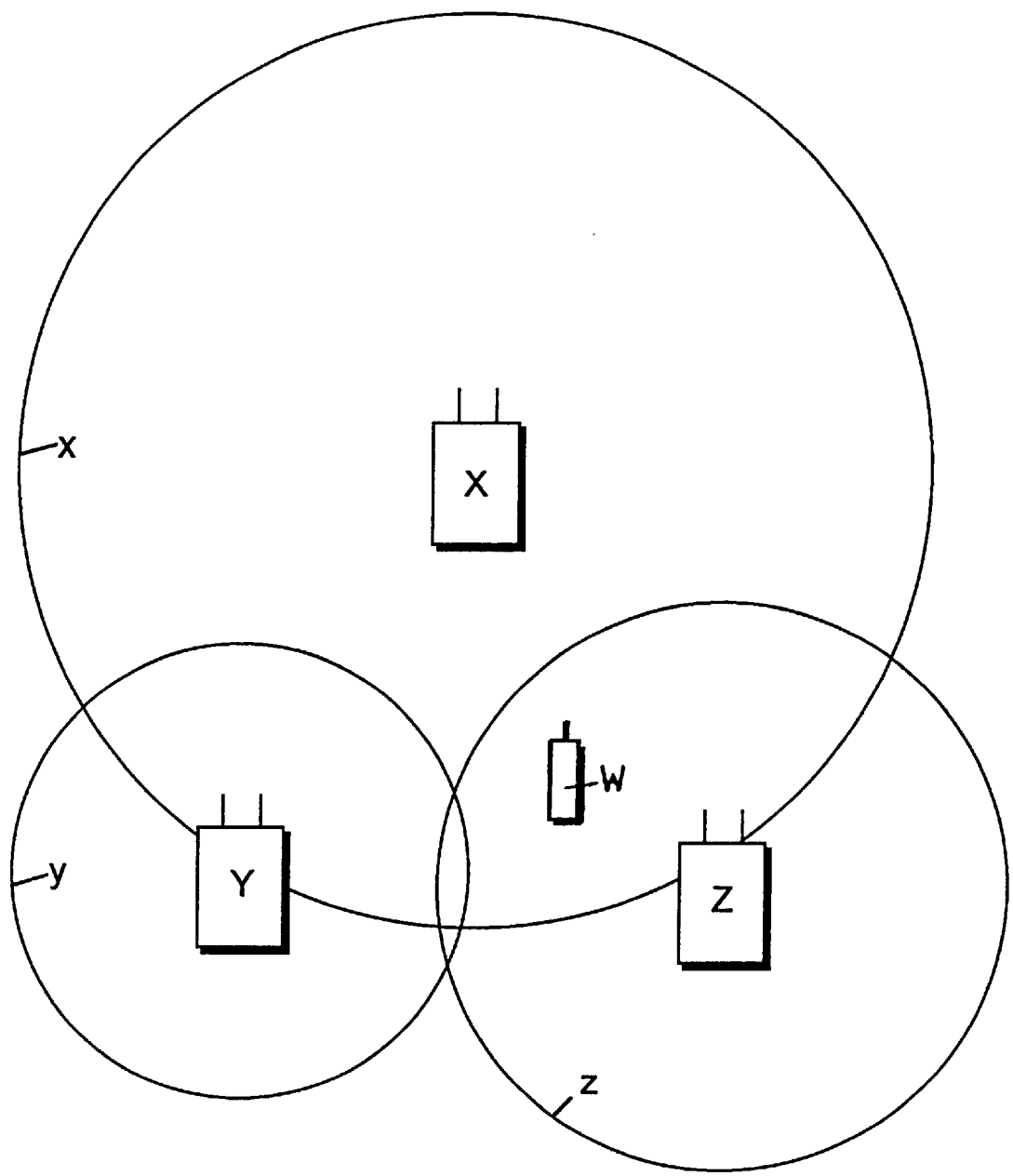
FIG. 5 shows, in a schematic and illustrative manner, co-located radio access units of a radio communication system according to the present invention.

Consider a radio communication system as shown in FIG. 5. A number of independent radio access unit X, Y, Z are shown, having a coverage or service area x, y, z respectively and applying both the FH and TH schemes according to the present invention. If their is no traffic on a radio access unit, it supports at least a dummy bearer providing a beacon. That is, a bearer at which no user data is transmitted (see FIG. 2). To avoid constant collisions between two nearby radio access units, both time hopping and frequency hopping are applied to the dummy bearer. Different radio access units preferably have different hop sequences in that the FH sequence is derived from the identity of the radio access unit. each radio access unit broadcasts its identity, such that a remote communication unit wishing to communicate to such a radio access unit, is able to acquire the hop sequence applied. Suitable frequency hop sequences are disclosed in the cited prior art.

If, as disclosed above, the FH sequence is such that the same frequency is visited again after all the other radio transmission channels have been visited, an unsynchronized, unlocked remote radio communication unit can wait at a single transmission channel while scanning all the time slots. Once a propper signal is received, the unlocked unit can follow the transmitter by hopping at the same rate and the time hop sequence as derived from the identity information.

Figure 6:
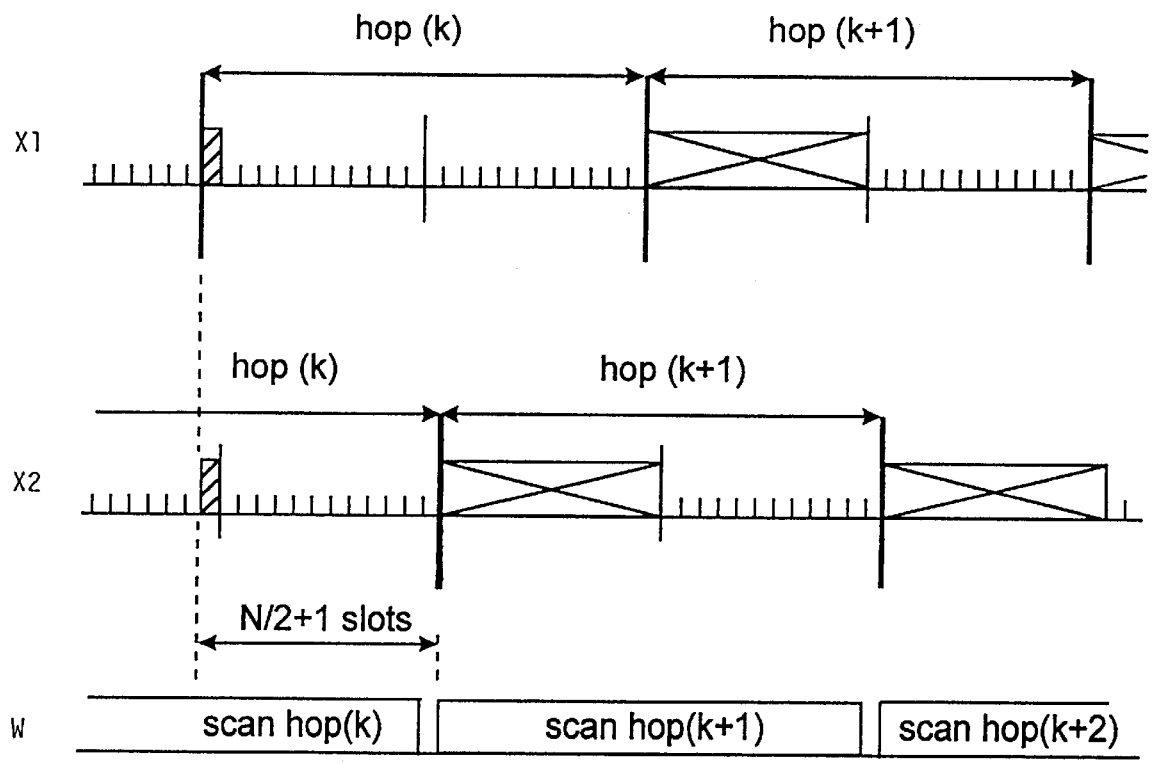
FIG. 6 shows, in a schematic and illustrative manner, scanning for frequency hop synchronisation, prior to time hop synchronisation.

Time hop sequences can be made dependent on the frame number. By defining an absolute frame number, which is broadcasted frequently, a unit that has found FH synchronisation can follow a transmitter by hopping with the frames and scanning all the time slots thereof. Once the frame arrives in which the absolute frame number is broadcasted, TH synchronisation can be established as well. The optimum point in time to hop is N/2+1 slots after the slot in which the propper signal was received, in the case of TDMA/TDD communication system comprising N time slots. This is explained with the help of FIG. 6.

The unit W that scans, does not know which time slot unit X is using for transmission. The two extremes are shown as X1, i.e. first time slot in a frame half, and X2, i.e. last time slot in a frame half. In the figure, the respective time slots are hatched. IF unit W jumps to the next frequency exactly N/2+1 slots after the leading edge of the received slot, a full scan in the next radio transmission frequency band will catch any time shifted bearer, determined by the shift pattern as indicated with a cross in the respective frame half. The scan can even be limited to N−1, which provides one slot to adjust the frequency synthesizer of the scanning unit W.

A unit in the standby mode preferably has a very low duty cycle in order to save power consumption. Periodically, the unit has to "wake up" in order to check for paging messages. Units that are locked, that is FH and TH synchronized, to a radio access unit can have a very low duty cycle. In between the wake up periods, a remote communication unit in standby can always wake up and establish a link since it is fully synchronised with the radio access unit. In contrast, the radio access unit has to wait until the unit in standby wakes up before it can establish a link. However, if FH and TH have not yet been established, the remote radio communication unit has to wake up periodically to support automatically locking. The wake up cycle of the remote radio communication unit in standby should slide through the transmit cycle of the radio access unit.

Figure 7:
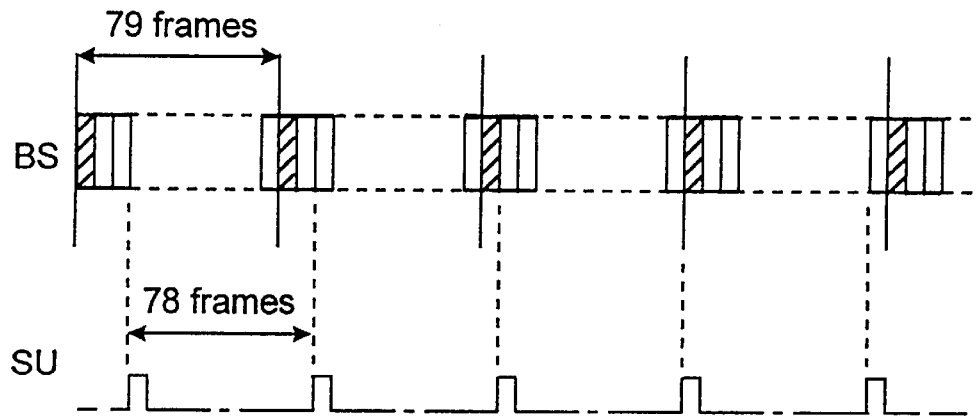
FIG. 7 shows, in a schematic and illustrative manner, a scanning method according to the invention of a radio communication unit in a non-locked standby mode.

Assume a radio access unit having a radio frequency transmission cycle of 79, as disclosed above, the wake up cycle of the remote communication unit in standby can be for example chosen 78. In this case, the remote Scanning Unit (SU) in standby moves in steps of −1 through the cycle of the radio access unit or Base Station (BS), as disclosed in FIG. 7. Preferably, the scan times in the standby unit are slightly larger than the steps in the sliding process to take into account slot misalignment.

In order to speed up the acquisition process, a paging message is send more frequently or even on all empty slots or dummy bearers including a paging message. Applying the FH sequence in reversed order, i.e. reversed to the normal FH sequence, the remote communication unit in standby is forced into an active mode wherein it scans continuously.

Although not disclosed explicitly, for use with the present invention, radio access units and radio remote communication units can be provided having appropriate transceiver means and control means, arranged for operating in accordance with the present invention.

Although the invention has been explained in connection with certain embodiments of TDMA and/or TDMA/TDD radio communication systems, the invention is not limited to a particular type of radio communication system and is generally applicable to mobile, cordless and any other radio communication systems.

What is claimed is:

1. A method of radio communication in a Time Division Multiple Access (TDMA) radio communication system, wherein a communication channel comprises at least one time slot of a plurality of sequential time slots forming a TDMA frame, and wherein a time slot of a frame hops in position between sequential frames, characterized in that the hopping of said time slot depends on the type of information being transmitted in said time slot, wherein a time slot allocated to a voice communication channel hops in position between sequential frames, and wherein the position of a time slot allocated to a data communication channel is fixed between sequential frames.

2. A method according to claim 1, wherein the hop positions of time slots allocated to voice communication channels are limited to time slots of a frame not allocated to data transmission channels.

3. A method according to claim 1, wherein time slots for data communication channels are allocated from one end of a frame and wherein time slots for voice communication channels are allocated from another end of said frame.

4. A method according to claim 3, wherein time slots allocated to data communication channels are clustered in adjacent time slots from said end of said frame.

5. A method according to claim 3, wherein said time slots allocated to voice communication channels are clustered in adjacent time slots from said other end of said frame.

6. A method according to claim 1, wherein each TDMA frame is divided in a first half and a second half of sequential time slots, wherein a duplex communication channel comprises corresponding time slots in each frame half in accordance with a Time Division Duplex (TDD) scheme, and wherein said time slots hop and are selected in accordance with a frame half.

7. A method according to claim 1, wherein for each consecutive frame a different time offset is determined which is added to the time slots of said frame allocated to a voice communication channel, said time offset comprising a multiple of a slot time.

8. A method according to claim 7, wherein a TDMA frame comprises N time slots and wherein a time hop space M in a frame is defined by:

$$M=N-Nd-1,$$

wherein Nd is the number of time slots of said TDMA frame occupied by data communication channels, and wherein in the case of a TDMA/TDD frame:

$$M=N/2-N'd-1$$

wherein N'd is the largest number of time slots in a frame half of said TDMA/TDD frame occupied by data communication channels.

9. A method according to claim 8, wherein hopping of said time slots wrap around time slot M−1 counted from another end of said TDMA frame, said first and second frame half in the case of a TDMA/TDD radio communication system.

10. A method according to claim 7, wherein said time offset of a frame is transferred to each communication unit of said radio communication system operative on a voice communication channel in said frame.

11. A method according to claim 1, wherein to each frame a frame reference is assigned, said frame reference being transmitted to each communication unit of said radio communication system, and wherein a hopping sequence of the time slots is associated with said frame reference.

12. A method according to claim 1, wherein said radio communication system is arranged for radio communication in a predetermined radio frequency transmission band comprising a plurality of radio frequency transmission channels, each such radio frequency transmission channel comprising a plurality of communication channels in a TDMA frame, wherein a time slot of each TDMA frame hops in position between said radio frequency transmission channels.

13. A method according to claim 12, wherein each subsequent frame is transmitted in a subsequent radio frequency transmission channel.

14. A method according to claim 13, wherein said radio communication system comprises at least first and second radio communication units, wherein said second unit continuously transmits in at least one time slot of a frame, and wherein a radio communication channel between a first and a second unit is established in that said first unit scans a particular radio frequency transmission channel for the receipt of a transmission of said second unit, and wherein at the receipt of said transmission, said first unit locks to the hopping of said second unit.

15. A method according to claim 14, wherein for scanning purposes, said first unit continually sweeps through the entire radio frequency transmission band, wherein a particular radio frequency transmission channel is scanned for a number of frames at least equal to the number of radio frequency transmission channels of said radio communication system.

16. A method according to claim 14, wherein said first unit is a remote radio communication unit, including a portable or mobile radio communication unit, and said second radio communication unit is a radio access unit of a radio communication system comprising a plurality of remote radio communication units.

17. A radio communication system comprising a plurality of radio access units and a plurality of remote radio communication units, each radio access unit providing radio communication service in a limited geographical area or cell by continuously transmitting in at least one time slot of a frame, each remote radio communication unit scanning a particular radio frequency transmission channel for receipt of a transmission from one of the radio access units and upon receipt locks to a hopping of the one radio access unit, wherein said radio access units and said remote radio telecommunication units are arranged for providing radio communication in accordance with the method of claim 1.

18. A radio communication system according to claim 17, wherein said radio access units transmit at a common radio frequency transmission band, wherein a radio frequency transmission channel hopping sequence is individual to a radio access unit.

19. A radio communication system according to claim 17, arranged for providing radio communication in the Industrial Scientific and Medical (ISM) frequency band, ranging from 2400 to 2483.5 MHz, comprising 79 radio frequency transmission channels, each channel having a transmission bandwidth of 1 MHz, wherein each TDMA frame has a length of 10 ms with a hopping rate of 100 hops/s over said radio frequency transmission channels, and wherein each TDMA frame comprises a first and second frame half each having 12 consecutive time slots in accordance with a TDMA/TDD communication scheme.

20. A radio access unit of a radio communication system for cordless telecommunication, comprising transceiver means and control means arranged for providing radio communication in a limited geographical area by continuously transmitting in at least one time slot of a frame in accordance with the method of claim 1.

21. A radio communication unit of a radio communication system for cordless telecommunication, comprising transceiver means and control means arranged for performing radio communication by scanning a particular radio frequency transmission channel for receipt of transmission and locking on to the transmission in accordance with the method of claim 1.

* * * * *